April 13, 1937.  D. L. SMITH  2,077,277
PIPE CUTTING OR WELDING APPARATUS
Filed June 20, 1934  3 Sheets-Sheet 1

INVENTOR
Donald L. Smith
BY
ATTORNEY

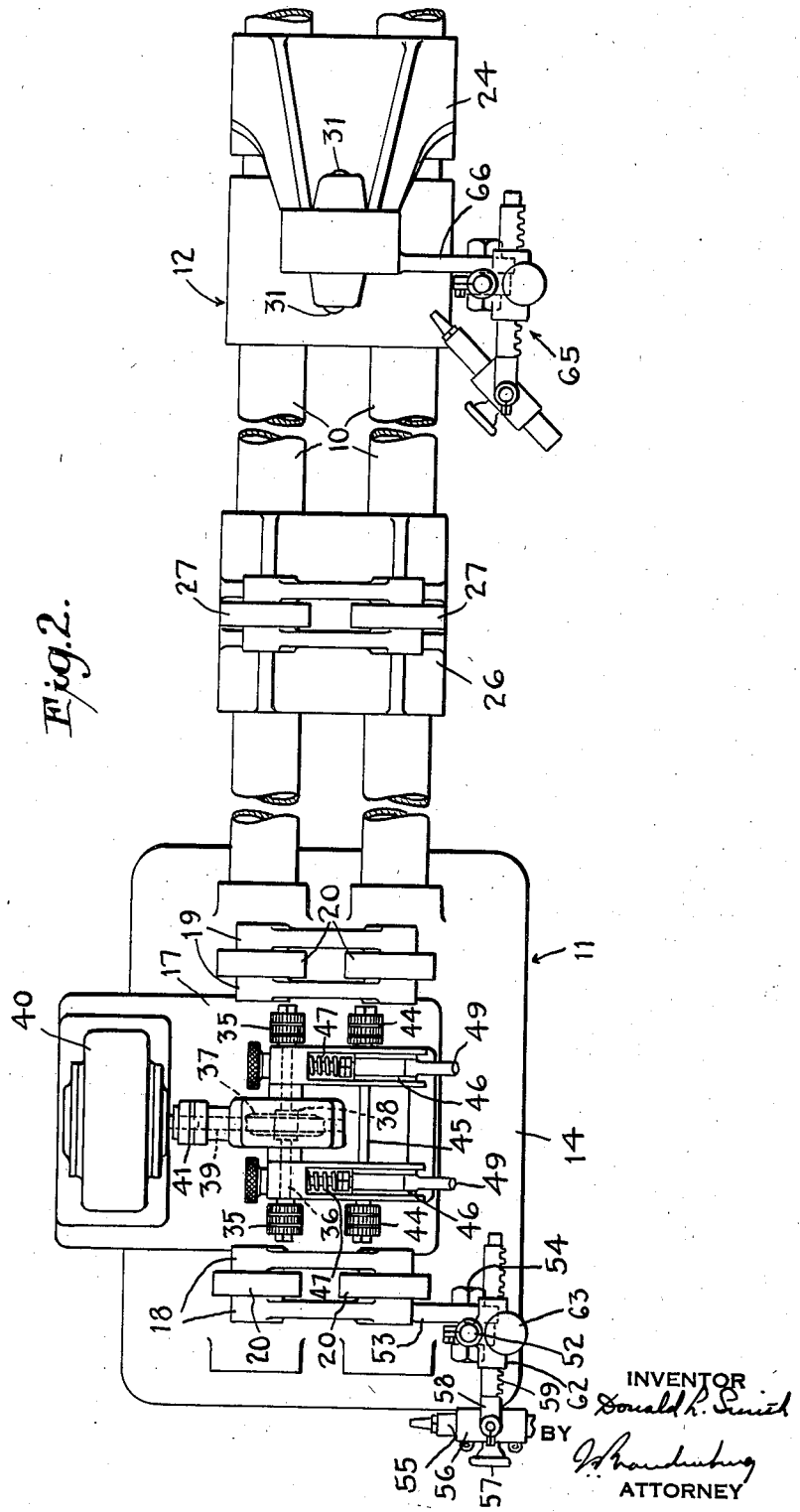

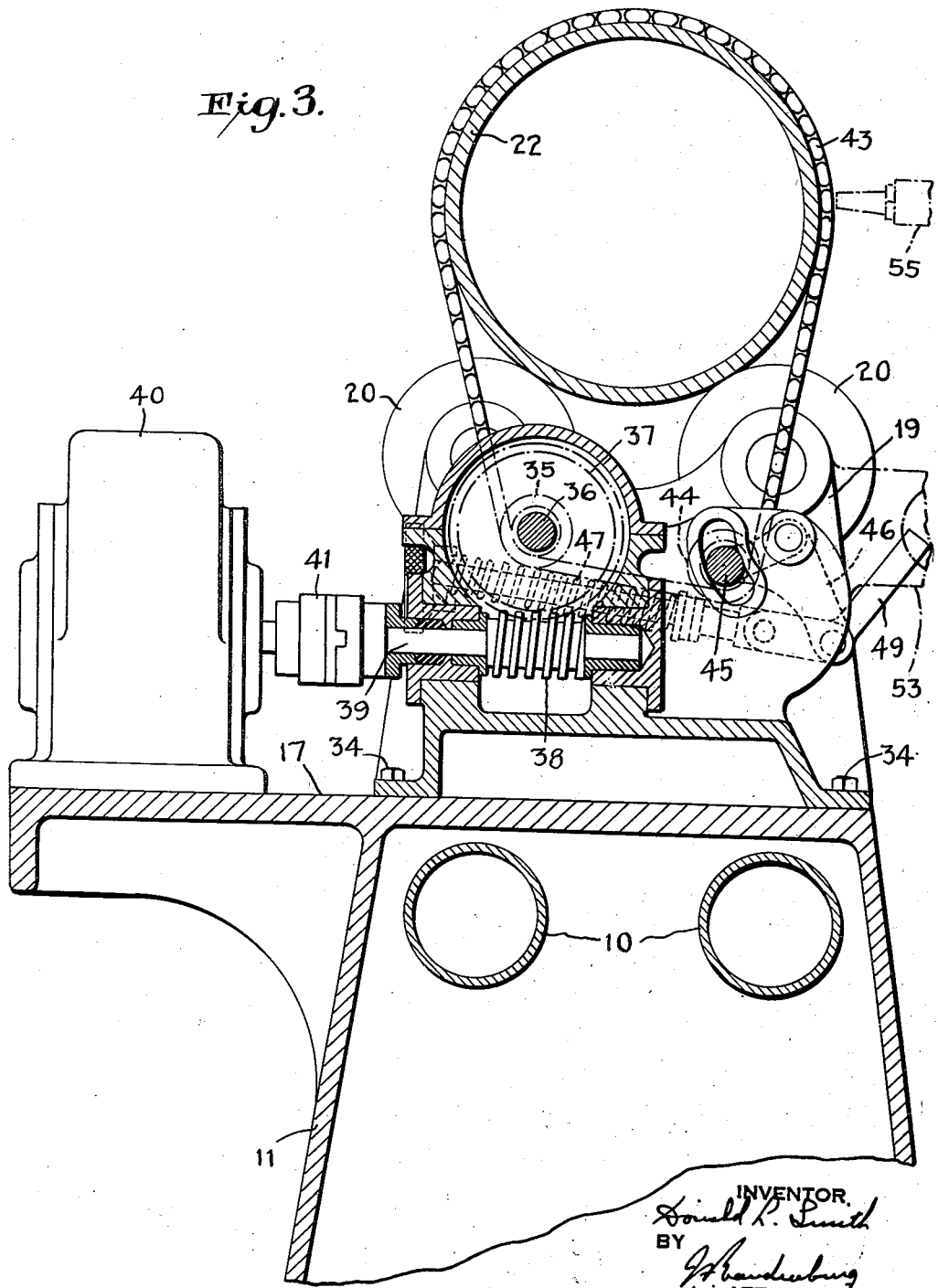

Patented Apr. 13, 1937

2,077,277

UNITED STATES PATENT OFFICE 2,077,277

PIPE CUTTING OR WELDING APPARATUS

Donald L. Smith, Dunellen, N. J., assignor to Air Reduction Company, Incorporated, New York, N. Y., a corporation of New York Application June 20, 1934, Serial No. 731,574

2 Claims. (Cl. 266—23)

This invention relates to pipe cutting or welding apparatus, and particularly to apparatus for shop use as distinguished from portable machines adapted to operate in the field.

The invention has for its object to provide an improved pipe cutting apparatus of the type having a stationary supporting bed on which the pipe turns with respect to one or more cutting torches, and comprises novel features and combinations of elements that make the apparatus economical to manufacture and convenient and advantageous in use.

According to one feature of the invention, a flexible element passes around the pipe and serves as the means for rotating the pipe on the supporting bed. The flexible element is preferably held against the pipe surface by a spring or other yielding force and it contacts with the pipe over a much larger friction surface than do the bed rollers on which the pipe is supported. The flexible element is therefore capable of rotating the pipe at a uniform speed with less danger of slippage than in machines which drive the pipe-supporting rollers to turn the pipe.

Other features of the invention include its adaptability to pipes of different lengths and diameters, and the convenient location of the torch or torches for cutting and beveling either end of a pipe, or both ends simultaneously.

Other objects, features and advantages of the invention will appear or be pointed out as the description proceeds.

In the accompanying drawings, forming part hereof:

Fig. 2 is a top plan view of the apparatus shown in Fig. 1, with the pipe removed; and Fig. 3 is an enlarged sectional view on the line 3—3 of Fig. 1.

Figure 1:
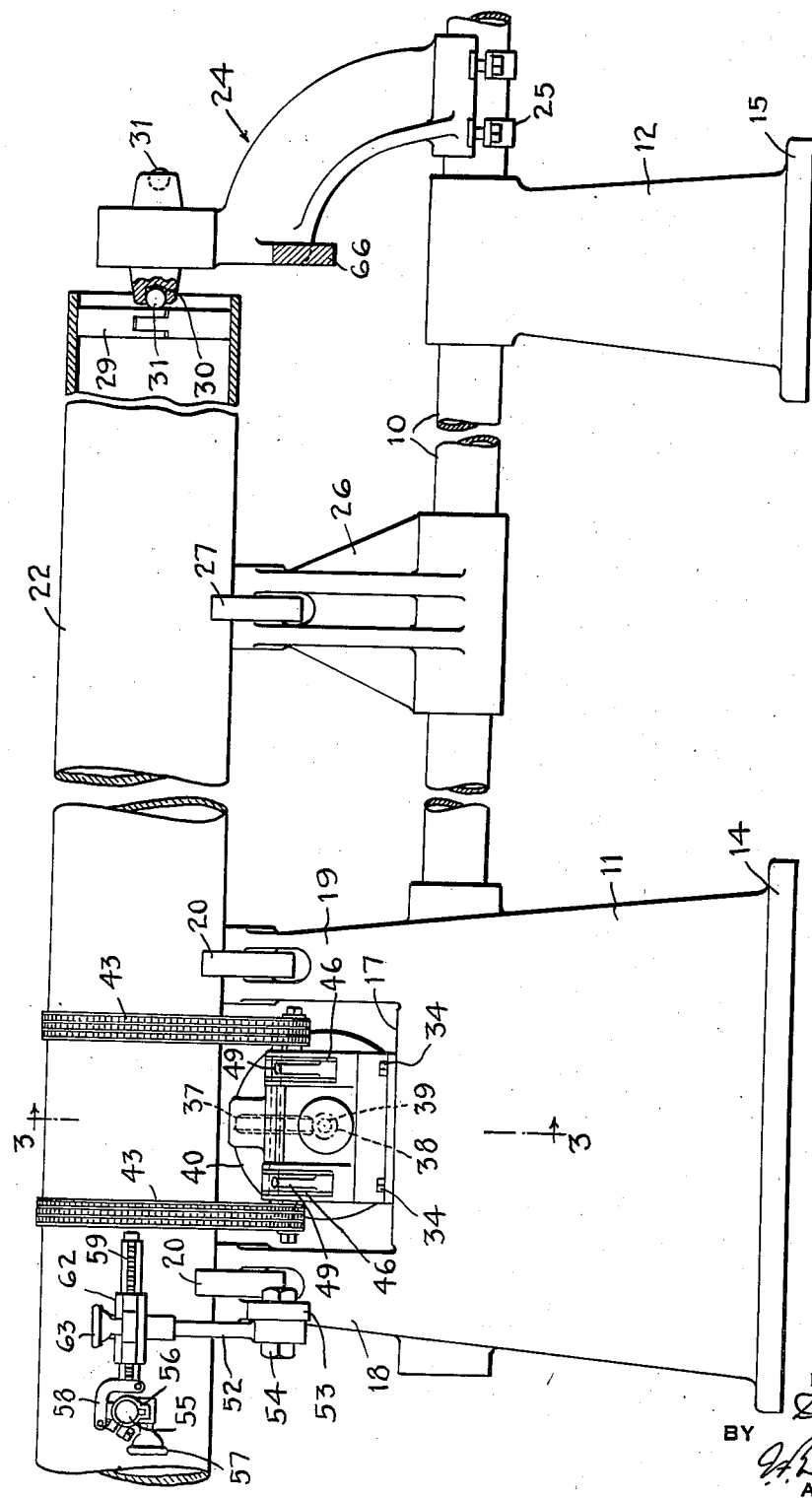
Fig. 1 is a side elevation of pipe cutting apparatus embodying the invention.

The machine illustrated in the drawings has a frame comprising two parallel bars 10 supported at one end by a main pedestal 11, and supported at a point intermediate their ends by a second pedestal 12. The bars 10 are preferably of tubular section in order to obtain greater stiffness in proportion to their weight. The bars 10 are connected to the pedestals 11 and 12.

The pedestal 11 has a base 14 which rests on the floor or other supporting surface. When the machine is used at a permanent location, the base 14 can be anchored to the shop floor, but ordinarily this is not essential because the frame is heavy and not easily moved or upset. The pedestal 12 has a base 15 by which it can be anchored to the shop floor if desirable.

There is a platform 17 on top of the pedestal 11, and both ends of the pedestal extend a substantial distance above the level of the platform and form roller supports 18 and 19. Each of these roller supports carries two rollers 20 which turn on parallel axes.

The corresponding rollers 20 of the roller supports 18 and 19 are preferably in axial alinement and their axis slopes slightly with respect to the horizontal so that a pipe 22 resting on the rollers tends to slide axially toward the right in Fig. 1.

An abutment or stop 24 prevents the pipe from moving further toward the right after it is correctly positioned on the machine. This stop is supported by the parallel bars 10 and can be clamped to these bars to accommodate the machine to cut pipe sections of any length within the range of the machine. The stop 24 is held in set position by a clamp 25 which is split so that its lower portion can be removed to permit the stop 24 to be taken off the bars 10 when moving it from one side to the other of the pedestal 12.

The stop 24 is curved to extend over the pedestal 12, as shown in Fig. 1. This stop can be put on the bars 10 so that it overhangs to the right, and when the stop is on the left of the pedestal 12 it will extend over the pedestal. This overhanging construction of the stop 24 makes it possible to locate it in position for cutting any length of pipe section within the range of the machine in spite of the fact that there is a length of the bars 10, where they pass through the pedestal 12, on which the stop 24 can not be clamped.

A support 26 carries rollers 27 which are in axial alinement with the rollers 20. The support 26 can be moved along the bars 10 between the pedestals 11 and 12 to any position necessary for supporting various lengths of pipe.

The sloping axis of the pipe 22 produces a component of the force of gravity to hold the pipe against the end abutment or stop 24. The pipe has a spider 29 clamped against its inside wall at the right end. The stop 24 has tapered faces, with a recess 30 in each face. A ball 31 is loosely retained in each recess by a spun-over edge of the recess. The balls 31 are in position to contact with the hub of the spider 29 substantially at its center, which is on the axis of the pipe. The pipe is thus held against axial movement toward the right with a minimum of friction resisting its rotation.

The spider 29 clamps against the inside wall of the pipe a short distance back from the end of the pipe so that a torch or torches can be used for trimming this end of the pipe as it rotates, as in Patent No. 1,928,121, dated September 26, 1933. The stop 24 can be readily removed and replaced with one of different size when the machine is to be used for substantially larger or smaller pipe. The spider 29 is constructed for use with a certain size of pipe, but it can be expanded and contracted to accommodate it to pipes of slightly different diameters. For substantially larger or smaller pipes other spiders are employed.

This invention can be used also with other means for preventing axial movement of the pipe. The abutment or stop 24 can be designed to abut directly against the end of the pipe 22, with or without anti-friction means.

The stop 24 projects into the pipe 22 for a short distance in Fig. 1, and if it is desirable to withdraw the stop before lifting the pipe with a crane or otherwise removing it from the machine, the clamp 25 is released and the stop 24 moved along the bars 10 away from the end of the pipe.

The pipe 22 is rotated by driving mechanism resting on the platform 17 and attached to the pedestal 11 by screws 34. The driving mechanism includes a sprocket wheel 35 secured on a shaft 36 with a worm wheel 37 which is driven by a worm 38. The worm 38 is fixed on a shaft 39 which is driven by a motor 40 through a coupling 41.

A flexible element comprising a sprocket chain 43 passes over the pipe 22 and under the sprocket wheel 35. An idler wheel 44, preferably a sprocket, is carried by an axle 45 on a bell crank 46 which is urged by a spring 47 to move counterclockwise in Fig. 3. This spring pressure causes the idler wheel 44 to tension the chain 43 and hold it against the pipe with pressure.

Rotation of the sprocket 35 moves the chain 43 and causes the pipe 22 to rotate. The pressure of the spring 47 increases the pressure of the pipe on the rollers 20, but its principal function is to increase the pressure of the chain on the pipe so that there is sufficient friction to prevent the chain from slipping. Any slipping of the chain on the pipe surface would cause the rotative speed of the pipe to vary and produce rough places in the cut.

The pressure of the spring 47 can be released from the sprocket chain by means operated by a handle 49 whenever it becomes desirable to have the chain slack, as when removing a pipe from the machine. The means for tensioning the chain and for relieving the tension are similar to the mechanism disclosed in the copending application of James L. Anderson, Serial No. 628,664, filed August 13, 1932 (now Patent No. 1,981,340, dated November 20, 1934). One of the links of the chain is opened when a pipe is to be removed from the machine. Links can be added or taken from the chain to accommodate it to pipes of different size, but the chain tensioning means permits a chain of given length to fit around pipes of different size where the difference is not great. The machine shown in the drawings has two chains 43, but a single chain can be used if desired.

A supporting arm 52 is connected to a lug 53 on the roller support 18 by a bolt 54. A torch 55 is carried by a torch holder 56 and can be moved axially in the torch holder by conventional rack and pinion mechanism operated by a hand wheel 57.

The torch holder 56 has a circular boss held in one end of a clamp 58 while the other end of this clamp fits over a circular end on a rack bar 59. The clamp 58 can be rotated on the rack bar and permits the torch to be set in any direction.

The rack bar 59 slides in a bearing 62 and is moved by a pinion connected with a hand wheel 63. The stop 24 is positioned for the approximate length of pipe to be cut, and the torch is moved into the exact longitudinal position on the pipe by turning the hand wheel 63. The bearing 62 has a clamp for connecting it to the supporting arm 52.

In addition to the movement of the torch, toward and from the pipe, by the hand wheel 57, the supporting arm 52 can be swung about the bolt 54 when a large movement of the torch assembly is necessary, as when changing to a different diameter of pipe.

When the machine is used for welding, the torch is located at the top of the pipe, a longer arm being substituted for the arm 52.

A torch assembly 65, similar to the assembly carried by the lug 53, is connected with a lug 66 on the stop 24. This torch assembly 65 is used to trim or bevel the right-hand end of the pipe while the torch 55 is cutting the pipe to the correct length.

Torch holders other than those described can be employed with the invention. When it is desirable to cut and bevel the pipe end according to the method disclosed in the Grow Patent No. 1,787,247, dated December 30, 1930, torch holders for two torches operating on the same end of the pipe are provided. It will be understood that the invention can be used with one torch only, and that other changes in the illustrated embodiment can be made within the scope of the claims.

I claim:

1. A pipe cutting or welding machine comprising a stationary frame including two pedestals and two parallel tubular members extending between the pedestals and connected to said pedestals, bed rollers on spaced parallel axles at the upper end of one of the pedestals, other bed rollers on spaced parallel axles carried by a support which is movable along the tubular members, each one of the rollers carried by said support having its axis extending in the same direction as the axis of one of the rollers at the upper end of the pedestal, the tubular members extending parallel to the axes of alinement of the rollers so that said alinement is maintained as the support is moved along the tubular members, means for rotating a pipe resting on the rollers including a chain adapted to pass around the pipe between its regions of support on the rollers, means connected with the frame below the pipe for driving the chain and maintaining it under a yielding tension, abutment means for preventing axial movement of the pipe on the rollers, and a support for the abutment means movable along the tubular frame members.

2. A machine for cutting or welding pipe including in combination an end pedestal, two spaced rollers supported on parallel axles by the pedestal, two parallel longitudinal frame members comprising tubes extending from one side of the pedestal in a direction parallel to the axes of said rollers, a second pedestal supporting the longitudinal frame members at a distance from the end pedestal, a roller support resting on the longitudinal frame members and movable along said frame members toward or from the end pedestal, rollers carried by said support with their axes extending in the same direction as the axes of the rollers on the end pedestal, means for rotating a pipe resting on the rollers including a chain adapted to pass around the pipe between its regions of support on the rollers, and means connected with the end pedestal below the pipe for driving the chain and maintaining it under a yielding tension.

DONALD L. SMITH.